(12) United States Patent
Inoue et al.

(10) Patent No.: US 8,919,893 B2
(45) Date of Patent: Dec. 30, 2014

(54) BRAKING DEVICE

(75) Inventors: Arata Inoue, Wako (JP); Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 13/256,792

(22) PCT Filed: Mar. 17, 2010

(86) PCT No.: PCT/JP2010/054567
§ 371 (c)(1),
(2), (4) Date: Sep. 15, 2011

(87) PCT Pub. No.: WO2010/107067
PCT Pub. Date: Sep. 23, 2010

(65) Prior Publication Data
US 2012/0000738 A1  Jan. 5, 2012

(30) Foreign Application Priority Data
Mar. 19, 2009 (JP) ................................ 2009-067929

(51) Int. Cl.
 *B60T 8/44* (2006.01)
 *B60T 17/22* (2006.01)
 *B60T 8/40* (2006.01)

(52) U.S. Cl.
CPC ............ *B60T 17/221* (2013.01); *B60T 8/4081* (2013.01); *B60T 8/442* (2013.01); *B06T 8/405* (2013.01); *B60T 2201/12* (2013.01)
USPC .................................................. 303/122.04

(58) Field of Classification Search
CPC ... B60T 17/221; B60T 2201/12; B60T 8/405; B60T 8/4045; B60T 8/4081; B60T 8/442
USPC .............. 303/10, 115.1, 115.2, 115.4–115.5, 303/122, 122.04; 60/567, 582
See application file for complete search history.

(56) References Cited

U.S. PATENT DOCUMENTS

| | | | |
|---|---|---|---|
| 3,911,760 A * | 10/1975 | Elbers et al. ..................... 74/512 |
| 4,659,153 A * | 4/1987 | Klein .......................... 303/114.3 |
| 4,817,767 A * | 4/1989 | Seibert et al. ................. 188/348 |
| 6,502,907 B2 | 1/2003 | Nakano | |
| 8,061,786 B2 | 11/2011 | Drumm et al. | |
| 2007/0188019 A1 | 8/2007 | Maki et al. | |

(Continued)

FOREIGN PATENT DOCUMENTS

| CN | 101039829 A | 9/2007 |
| DE | 3424912 A1 | 1/1986 |

(Continued)

*Primary Examiner* — Anna Momper
(74) *Attorney, Agent, or Firm* — Carrier Blackman & Associates, P.C.; William D. Blackman; Joseph P. Carrier

(57) ABSTRACT

Under a normal condition, brake fluid pressure generated by a slave cylinder (23) that operates according to operation of a brake pedal (12) is fed to a wheel cylinder (16, 17; 20, 21) to perform braking, while under a fault condition of the slave cylinder (23), brake fluid pressure generated by a master cylinder (11) for backup that operates by the operation of the brake pedal (12) is fed to the wheel cylinder (16, 17; 20, 21) to perform braking. In the latter case, brake fluid fed by a pump (64) is fed to the wheel cylinder (16, 17; 20, 21), before the brake fluid is fed from the master cylinder (11) to the wheel cylinder (16, 17; 20, 21) by a driver depressing the brake pedal (12). Accordingly, without leading to an increase in the stroke of the brake pedal (12), a required amount of brake fluid can be fed to the wheel cylinder (16, 17; 20, 21) to thus ensure a sufficient braking force.

9 Claims, 6 Drawing Sheets

(56) References Cited

U.S. PATENT DOCUMENTS

| | | |
|---|---|---|
| 2008/0210496 A1 | 9/2008 | Ishii |
| 2008/0223675 A1* | 9/2008 | Hatano ............... 188/345 |

FOREIGN PATENT DOCUMENTS

| | | |
|---|---|---|
| EP | 1 138 565 A2 | 10/2001 |
| EP | 1 334 893 A2 | 8/2003 |
| JP | 2002-173009 A | 6/2002 |
| JP | 2005-343366 A | 12/2005 |
| JP | 2007-186173 A | 7/2007 |
| JP | 2007-216773 A | 8/2007 |
| JP | 2007-276683 A | 10/2007 |
| JP | 2008-174169 A | 7/2008 |
| JP | 2008-273440 A | 11/2008 |

* cited by examiner

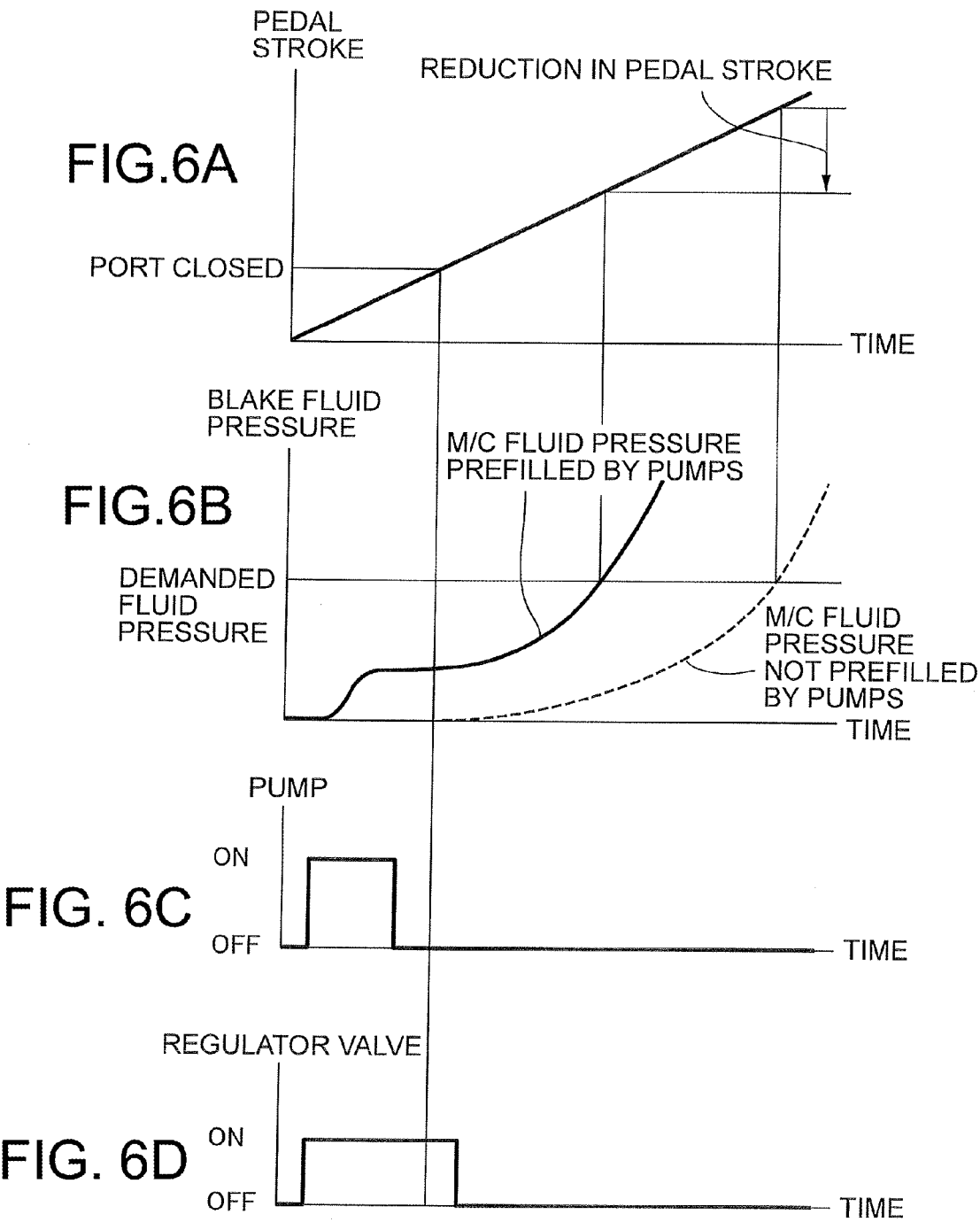

BRAKING DEVICE

TECHNICAL FIELD

The present invention relates to a braking device including: a master cylinder that generates brake fluid pressure by operation of a brake pedal by a driver; a wheel cylinder that performs braking on a wheel; and a slave cylinder disposed between the master cylinder and the wheel cylinder, the slave cylinder generating brake fluid pressure by an electric motor that operates according to the operation of the brake pedal, the wheel cylinder being configured to be brought into operation by the brake fluid pressure generated by the master cylinder under a fault condition of the slave cylinder.

BACKGROUND ART

Such a brake-by-wire (BBW) type braking device is known from Patent Document 1 below.
Patent Document 1: Japanese Patent Application Laid-open No. 2008-174169

DISCLOSURE OF INVENTION

Problems to be Solved by the Invention

Incidentally, in order to reduce pedal stroke of a brake pedal for acquiring a required braking force, it is conceivable to transmit pedal pressure applied on the brake pedal by a driver to a master cylinder through a linkage mechanism, thereby increasing stroke of a piston of the master cylinder relative to the stroke of the brake pedal; however, an adequate reduction in the pedal stroke is difficult only with the linkage mechanism. Therefore, it is conceivable to prefill a wheel cylinder with brake fluid fed by a pump, in addition to brake fluid fed by the master cylinder, thereby reducing the pedal stroke of the brake pedal. In this case, it is desirable to minimize energy required to prefill the wheel cylinder.

The present invention has been made in consideration for the foregoing problems. An object of the present invention is to achieve, in a braking device of BBW type, a reduction in the pedal stroke and savings in energy required to prefill the wheel cylinder, when doing braking by brake fluid pressure generated by the master cylinder under fault conditions of a slave cylinder.

Means for Solving the Problems

In order to attain the above object, according to a first feature of the present invention, there is proposed a braking device including: a master cylinder that generates brake fluid pressure by operation of a brake pedal by a driver; a wheel cylinder that performs braking on a wheel; and a slave cylinder disposed between the master cylinder and the wheel cylinder, the slave cylinder generating brake fluid pressure by an electric motor that operates according to the operation of the brake pedal, the wheel cylinder being configured to be brought into operation by the brake fluid pressure generated by the master cylinder under a fault condition of the slave cylinder, characterized in that a pump that feeds brake fluid is disposed between the slave cylinder and the wheel cylinder, and, under the fault condition of the slave cylinder, during an initial period of the operation of the brake pedal, the pump feeds the brake fluid to the wheel cylinder.

Furthermore, according to a second feature of the present invention, in addition to the first feature, there is proposed the braking device, wherein the brake pedal includes a link mechanism that boosts pedal pressure applied by the driver and transmits the boosted pressure to the master cylinder.

Moreover, according to a third feature of the present invention, in addition to the first or second feature, there is proposed the braking device, wherein ineffective stroke is set for the brake pedal before the master cylinder starts operating.

Furthermore, according to a fourth feature of the present invention, in addition to any one of the first to third features, there is proposed the braking device, further including a stroke simulator connected to the master cylinder via a reaction force admission valve, wherein the reaction force admission valve is closed before the pump is driven.

Effects of the Invention

According to the first feature of the present invention, under a normal condition, the brake fluid pressure generated by the slave cylinder that operates according to the operation of the brake pedal by the driver is fed to the wheel cylinder to perform braking, while under a fault condition of the slave cylinder, the brake fluid pressure generated by the master cylinder for backup that operates by the operation of the brake pedal by the driver is fed to the wheel cylinder to perform braking. In the latter case, the brake fluid fed by the pump is prefilled into the wheel cylinder, before the brake fluid is fed from the master cylinder to the wheel cylinder by the driver applying pressure on the brake pedal. Accordingly, even with a small amount of stroke of the brake pedal, a required amount of brake fluid can be fed to the wheel cylinder to thus ensure a sufficient braking force. Moreover, prefilling takes place during the initial period of the operation of the brake pedal in which the brake fluid pressure on the wheel cylinder is low, and thus drive energy of the pump required for the prefilling can be minimized.

In addition, according to the second feature of the present invention, when the brake pedal is provided with the link mechanism that boosts the pedal pressure applied by the driver and transmit the boosted pressure to the master cylinder, the stroke of the brake pedal increases and hence operability deteriorates; however, during the initial period of the operation of the brake pedal, the pump is brought into operation to prefill the wheel cylinder, thus enabling a reduction in the stroke of the brake pedal.

Moreover, according to the third feature of the present invention, when a predetermined ineffective stroke is set for the brake pedal, pedal feeling improves, but on the other hand, the stroke of the brake pedal increases; however, during the initial period of the operation of the brake pedal, the pump is brought into operation to prefill the wheel cylinder, thus enabling compensation for the increase in the above-mentioned stroke.

Furthermore, according to the fourth feature of the present invention, even when the stroke simulator is connected to the master cylinder via the reaction force admission valve, the reaction force admission valve is closed before the pump is driven, and thus, the brake fluid from the master cylinder is prefilled into the wheel cylinder without being absorbed by the stroke simulator, so that the stroke of the brake pedal can be more effectively reduced.

BRIEF DESCRIPTION OF DRAWINGS

FIG. 6 is time charts explaining operations. (first embodiment)

EXPLANATION OF REFERENCE NUMERALS AND SYMBOLS

Figure 1:
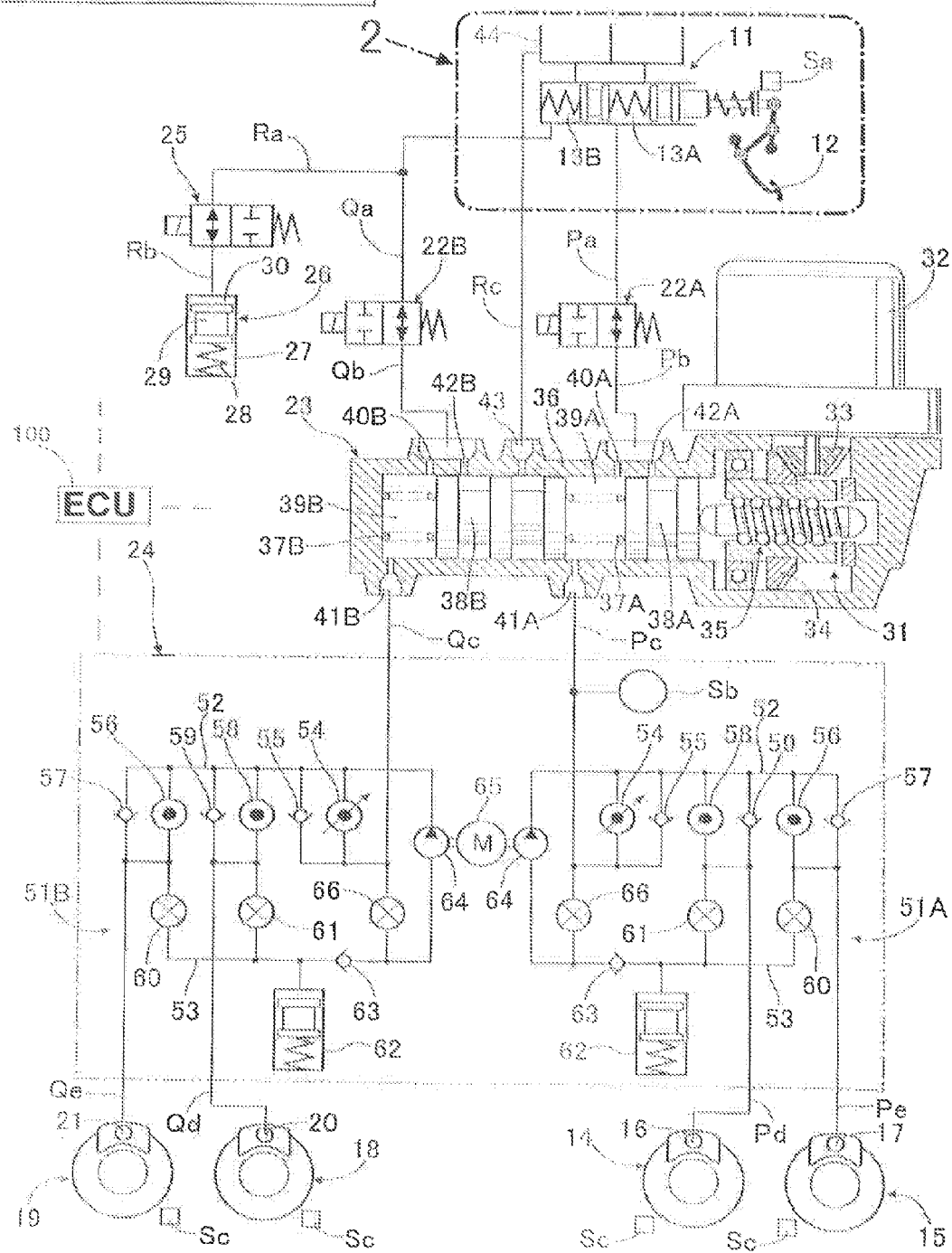
FIG. 1 is a diagram of a fluid pressure circuit of a vehicle braking device under a normal condition. (first embodiment)

11 Master cylinder
12 Brake pedal
16 Wheel cylinder
17 Wheel cylinder
20 Wheel cylinder
21 Wheel cylinder
23 Slave cylinder
25 Reaction force admission valve
26 Stroke simulator
32 Electric motor
64 Pump
79 First link (link mechanism)
81 Second link (link mechanism)

BEST MODE FOR CARRYING OUT THE INVENTION

A mode for carrying out the present invention is explained below based on FIGS. 1 to 6.
First Embodiment As shown in FIG. 1, a tandem type master cylinder 11 includes rear and front fluid pressure chambers 13A and 13B that output brake fluid pressure according to pedal pressure which a driver applies on a brake pedal 12. The rear fluid pressure chamber 13A is connected for example to wheel cylinders 16 and 17 of disc brake devices 14 and 15 for a left front wheel and a right rear wheel through fluid paths Pa, Pb, Pc, Pd and Pe (or a first system). The front fluid pressure chamber 13B is connected for example to wheel cylinders 20 and 21 of disc brake devices 18 and 19 for a right front wheel and a left rear wheel through fluid paths Qa, Qb, Qc, Qd and Qe (or a second system).

Figure 2:
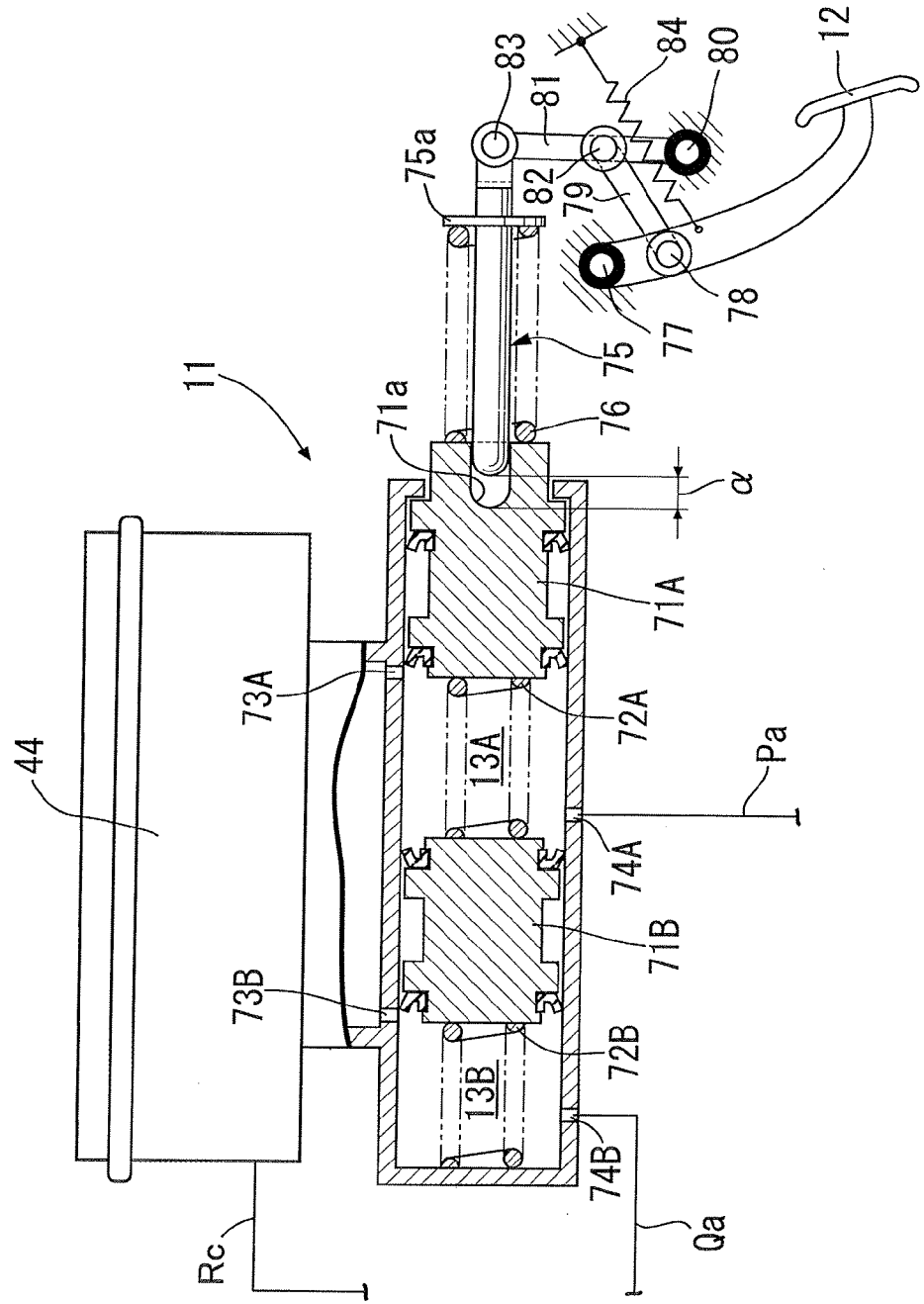
FIG. 2 is an enlarged view of a portion indicated by an arrow 2 in FIG. 1. (first embodiment)

As shown in FIG. 2, the master cylinder 11 includes a rear piston 71A located rearward of the rear fluid pressure chamber 13A, a front piston 71B located rearward of the front fluid pressure chamber 13B, and return springs 72A and 72B disposed in the rear and front fluid pressure chambers 13A and 13B, respectively. In the rear fluid pressure chamber 13A, a rear inlet port 73A that communicates with a reservoir 44 and a rear outlet port 74A that communicates with the fluid path Pa are formed. In the front fluid pressure chamber 13B, a front inlet port 73B that communicates with the reservoir 44 and a front outlet port 74B that communicates with the fluid path Qa are formed.

A push rod 75 that is fitted in a recess 71a formed in a rear end of the rear piston 71A is provided with a flange 75a at its rear portion, and a coil spring 76 is compressedly provided between a front face of the flange 75a and the rear end of the rear piston 71A. One end of a first link 79 is pivotably supported by a pin 78 to an intermediate portion of the brake pedal 12 pivotably supported at an upper end to a vehicle body by a pin 77. The other end of the first link 79 is pivotably supported by a pin 82 to an intermediate portion of a second link 81 pivotably supported at one end to the vehicle body by a pin 80, while the other end of the second link 81 is pivotably supported by a pin 83 to a rear end of the push rod 75. The brake pedal 12 is urged in a direction of retreating movement by a return spring 84, and its limit of retreating movement is restricted by an unillustrated stopper. In this state, clearance a that effects ineffective stroke of the brake pedal 12 is formed between a front end of the push rod 75 and the recess 71a formed in the rear end of the rear piston 71A.

Thus, when the driver applies pressure on the brake pedal 12, the pedal pressure is transmitted to the rear piston 71A through the first link 79, the second link 81 and the push rod 75 thereby to generate brake fluid pressure in the rear fluid pressure chamber 13A. When the brake fluid pressure is generated in the rear fluid pressure chamber 13A, the front piston 71B moves forward thereby to generate brake fluid pressure in the front fluid pressure chamber 13B. At this time, the connection of the brake pedal 12 to the push rod 75 via the first and second links 79 and 81 enables boosting the pedal pressure which the driver applies on the brake pedal 12 and transmitting the boosted pressure to the push rod 75. Also, the clearance a formed between the front end of the push rod 75 and the recess 71a of the rear piston 71A enables eliminating the feeling that the brake pedal 12 does not move smoothly due to static friction of parts at the start of application of pressure on the brake pedal 12, and hence achieving an improvement in pedal feeling.

Returning to FIG. 1, a shut-off valve 22A as a normally open type electromagnetic valve is disposed between the fluid paths Pa and Pb, a shut-off valve 22B as a normally open type electromagnetic valve is disposed between the fluid paths Qa and Qb, a slave cylinder 23 is disposed between the fluid paths Pb, Qb and the fluid paths Pc, Qc, and a VSA (vehicle stability assist) device 24 is disposed between the fluid paths Pc, Qc and the fluid paths Pd, Pe and Qd, Qe.

A stroke simulator 26 is connected to fluid paths Ra and Rb branching off from the fluid path Qa, via a reaction force admission valve 25 as a normally closed type electromagnetic valve. The stroke simulator 26 is configured such that a piston 29 which is urged by a spring 28 is slidably fitted in a cylinder 27, and a fluid pressure chamber 30 formed on the piston 29 on the side thereof opposite to the spring 28 communicates with the fluid path Rb.

An actuator 31 of the slave cylinder 23 includes an electric motor 32, a drive bevel gear 33 provided on an output shaft of the electric motor 32, a driven bevel gear 34 that is in engagement with the drive bevel gear 33, and a ball screw mechanism 35 that operates by the driven bevel gear 34.

A rear piston 38A and a front piston 38B which are urged in the direction of retreating movements by the return springs 37A and 37B, respectively, are slidably disposed in a rear portion and a front portion of a cylinder body 36 of the slave cylinder 23, and a rear fluid pressure chamber 39A and a front fluid pressure chamber 39B are defined on the front faces of the rear piston 38A and the front piston 38B, respectively.

The rear fluid pressure chamber 39A communicates with the fluid path Pb through a rear input port 40A and also communicates with the fluid path Pc through a rear output port 41A, while the front fluid pressure chamber 39B communicates with the fluid path Qb through a front input port 40B and also communicates with the fluid path Qc through a front output port 41B.

Thus, in FIG. 1, when the electric motor 32 is driven in a direction, the rear and front pistons 38A and 38B move forward through the drive bevel gear 33, the driven bevel gear 34 and the ball screw mechanism 35, and, at the instant of blockage of the rear and front input ports 40A and 40B leading to the fluid paths Pb and Qb, brake fluid pressure is generated in the rear and front fluid pressure chambers 39A and 39B, and the brake fluid pressure can be outputted to the fluid paths Pc and Qc through the rear and front output ports 41A and 41B.

The structure of the VSA device 24 is a well-known one, and the VSA devices having the same structure are provided in a first brake actuator 51A that controls the first system of the disc brake devices 14 and 15 for the left front wheel and the right rear wheel, and a second brake actuator 51B that controls the second system of the disc brake devices 18 and 19 for the right front wheel and the left rear wheel.

Description will be given below by way of representative of the first brake actuator 51A for the first system of the disc brake devices 14 and 15 for the left front wheel and the right rear wheel.

The first brake actuator 51A is disposed between the fluid path Pc leading to the rear output port 41A of the slave cylinder 23, located on the upstream side, and the fluid paths Pd and Pe leading to the wheel cylinders 16 and 17, respectively, of the left front wheel and the right rear wheel, located on the downstream side.

The first brake actuator 51A includes common fluid paths 52 and 53 for the wheel cylinders 16 and 17 of the left front wheel and the right rear wheel, and includes a regulator valve 54 constructed of a normally open type electromagnetic valve with variable opening degree disposed between the fluid path Pc and the fluid path 52; a check valve 55 disposed in parallel with the regulator valve 54 to permit flow of brake fluid from the fluid path Pc side to the fluid path 52 side; an in-valve 56 constructed of a normally open type electromagnetic valve disposed between the fluid path 52 and the fluid path Pe; a check valve 57 disposed in parallel with the in-valve 56 to permit flow of brake fluid from the fluid path Pe side to the fluid path 52 side; an in-valve 58 constructed of a normally open type electromagnetic valve disposed between the fluid path 52 and the fluid path Pd; a check valve 59 disposed in parallel with the in-valve 58 to permit flow of brake fluid from the fluid path Pd side to the fluid path 52 side; an out-valve 60 constructed of a normally closed type electromagnetic valve disposed between the fluid path Pe and the fluid path 53; an out-valve 61 constructed of a normally closed type electromagnetic valve disposed between the fluid path Pd and the fluid path 53; a reservoir 62 connected to the fluid path 53; a check valve 63 disposed between the fluid path 53 and the fluid path 52 to permit flow of brake fluid from the fluid path 53 side to the fluid path 52 side; a pump 64 disposed between the check valve 63 and the fluid path 52 to feed brake fluid from the fluid path 53 side to the fluid path 52 side; an electric motor 65 that drives the pump 64; and a suction valve 66 constructed of a normally closed type electromagnetic valve disposed between an intermediate position between the check valve 63 and the pump 64 and the fluid path Pc.

Incidentally, the electric motor 65 is common for the pumps 64 and 64 of the first and second brake actuators 51A and 51B; however, the electric motors 65 and 65 may be provided solely for the pumps 64 and 64, respectively.

The brake pedal 12 is provided with a stroke sensor Sa that detects the stroke of the brake pedal 12, a fluid pressure sensor Sb that detects brake fluid pressure generated by the slave cylinder 23 is provided in the fluid path Pc on one inlet side of the VSA device 24, and wheel speed sensors Sc, . . . are provided in four wheels, respectively.

Figure 3:
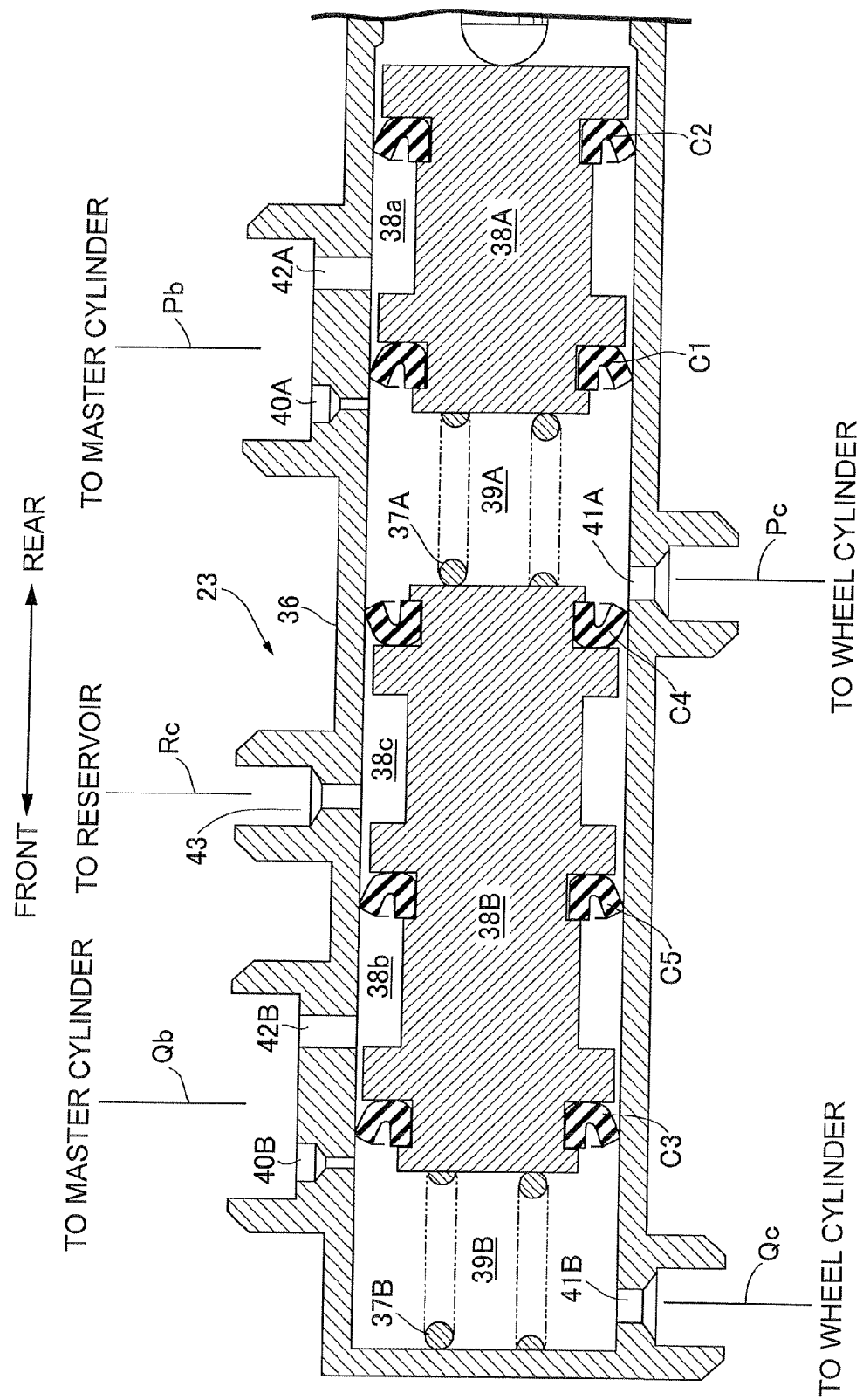
FIG. 3 is an enlarged sectional view of a slave cylinder. (first embodiment)

As is apparent from FIG. 3, the slave cylinder 23 is such that the rear fluid pressure chamber 39A communicates with the fluid path Pb through the rear input port 40A and a rear supply port 42A and also communicates with the fluid path Pc through the rear output port 41A. Also, the front fluid pressure chamber 39B communicates with the fluid path Qb through the front input port 40B and a first front supply port 42B and also communicates with the fluid path Qc through the front output port 41B.

A front end of the rear piston 38A is provided with a first rear cup seal C1 facing forward (so as to perform a sealing function during forward movement), while a rear end of the rear piston 38A is provided with a second rear cup seal C2 facing forward. A front end of the front piston 38B is provided with a first front cup seal C3 facing forward, while a rear end of the front piston 38B is provided with a second front cup seal C4 facing backward (so as to perform a sealing function during backward movement). Further, an intermediate portion of the front piston 38B is provided with a third front cup seal C5 facing forward.

A rear reservoir chamber 38a sandwiched between the first and second rear cup seals C1 and C2 is formed in an intermediate portion of the rear piston 38A, and the rear supply port 42A communicates with the rear reservoir chamber 38a. A first front reservoir chamber 38b sandwiched between the first and third front cup seals C3 and C5 is formed in a front portion of the front piston 38B, and the first front supply port 42B communicates with the first front reservoir chamber 38b. Also, a second front reservoir chamber 38c sandwiched between the second and third front cup seals C4 and C5 is formed in a rear portion of the front piston 38B, and a second front supply port 43 communicates with the second front reservoir chamber 38c. The second front supply port 43 communicates with the reservoir 44 of the master cylinder 11 through a fluid path Rc. (See FIG. 1.)

The rear fluid pressure chamber 39A is kept fluid-tight by being sandwiched between the forward-facing first rear cup seal C1 and the backward-facing second front cup seal C4, and also, the forward-facing second rear cup seal C2 blocks the fluid from leaking rearward from the rear reservoir chamber 38a. The front fluid pressure chamber 39B is kept fluid-tight by the forward-facing first front cup seal C3, and also, the forward-facing third front cup seal C5 blocks the fluid from leaking rearward from the first front reservoir chamber 38b.

The brake fluid in the second front reservoir chamber 38c that communicates with the reservoir 44 of the master cylinder 11 through the second front supply port 43 and the fluid path Rc can flow into the rear fluid pressure chamber 39A through the second front cup seal C4 that functions as a one-way valve, and also can flow into the front fluid pressure chamber 39B through the third front cup seal C5 and the first front cup seal C3 that function as one-way valves.

During non-operation of the slave cylinder 23, the first rear cup seal C1 of the rear piston 38A is located immediately rearward of the rear input port 40A, and slight forward movement of the rear piston 38A allows the first rear cup seal C1 to pass the rear input port 40A, thereby generating brake fluid pressure in the rear fluid pressure chamber 39A. During non-operation of the slave cylinder 23, the first front cup seal C3 of the front piston 38B is located immediately rearward of the front input port 40B, and slight forward movement of the front piston 38B allows the first front cup seal C3 to pass the front input port 40B, thereby generating brake fluid pressure in the front fluid pressure chamber 39B.

An electronic control unit 100 supplied with input signals from the stroke sensor Sa, the fluid pressure sensor Sb and the wheel speed sensors Sc, . . . , is programmed to control operation of the shut-off valves 22A and 22B, the VSA device 24, the reaction force admission valve 25 and the slave cylinder 23.

Next, operations or effects of the embodiment of the present invention including the above-described configuration will be described.

Under normal conditions where the system functions normally, as shown in FIG. 1, the shut-off valves 22A and 22B constructed of the normally open type electromagnetic valves are opened by demagnetization, and the reaction force admission valve 25 constructed of the normally closed type electromagnetic valve is opened by excitation. In this state, when the stroke sensor Sa detects that the driver applies pressure on the brake pedal 12, the electric motor 32 of the slave cylinder 23 operates to effect forward movement of the rear and front pistons 38A and 38B, thereby generating brake fluid pressure in the rear and front fluid pressure chambers 39A and 39B. The brake fluid pressure is transmitted to the wheel cylinders 16, 17 and 20, 21 of the disc brake devices 14, 15 and 18, 19 through the opened in-valves 56, 56 and 58, 58 of the VSA device 24 thereby to apply brakes to the wheels, respectively.

Slight forward movement of the rear and front pistons 38A and 38B of the slave cylinder 23 interrupts communication between the fluid paths Pb, Qb and the rear and front fluid pressure chambers 39A, 39B, and thus, brake fluid pressure generated by the master cylinder 11 is not transmitted to the disc brake devices 14, 15 and 18, 19. At this time, brake fluid pressure generated by the front fluid pressure chamber 13B of the master cylinder 11 is transmitted to the fluid pressure chamber 30 of the stroke simulator 26 through the opened reaction force admission valve 25 to effect movement of the piston 29 against the spring 28 and thereby permit the stroke of the brake pedal 12 and also generate a pseudo pedal reaction force, thus enabling elimination of driver's uncomfortable feeling.

At this time, a target brake fluid pressure is mapped from the stroke of the brake pedal 12 detected by the stroke sensor Sa, a target stroke of the slave cylinder 23 is further mapped from the target brake fluid pressure, and an angle of rotation of the electric motor 32 of the slave cylinder 23 is controlled so as to achieve the target stroke, thereby enabling the slave cylinder 23 to generate brake fluid pressure according to the stroke of the brake pedal 12 and supply the brake fluid pressure to the wheel cylinders 16, 17 and 20, 21.

Next, operations or effects of the VSA device 24 will be described.

Under non-operation of the VSA device 24, the regulator valves 54 and 54 are opened by demagnetization, the suction valves 66 and 66 are closed by demagnetization, the in-valves 56, 56 and 58, 58 are opened by demagnetization, and the out-valves 60, 60 and 61, 61 are closed by demagnetization. Thus, when the slave cylinder 23 operates by the driver applying pressure on the brake pedal 12 in order to perform braking, brake fluid pressure outputted through the rear and front output ports 41A and 41B of the slave cylinder 23 can be fed from the regulator valves 54 and 54 via the in-valves 56, 56 and 58, 58 in the open position to the wheel cylinders 16, 17 and 20, 21 thereby to apply brakes to the four wheels.

Under operation of the VSA device 24, with the suction valves 66 and 66 opened by excitation, the pumps 64 and 64 are driven by the electric motor 65, and brake fluid that has been sucked from the slave cylinder 23 side through the suction valves 66 and 66 and pressurized by the pumps 64 and 64 is fed to the regulator valves 54 and 54 and the in-valves 56, 56 and 58, 58. Thus, the regulator valves 54 and 54 are excited to adjust the opening degree and thereby regulate brake fluid pressure in the fluid paths 52 and 52, and also, the brake fluid pressure is selectively fed to the wheel cylinders 16, 17 and 20, 21 through the in-valves 56, 56 and 58, 58 opened by excitation, thereby enabling individual control of braking forces on the four wheels, even when the driver does not apply pressure on the brake pedal 12.

Thus, the first and second brake actuators 51A and 51B perform individual control of the braking forces on the four wheels, thereby enabling an increase in braking force on a turning inner radius and hence an improvement in turnability, or an increase in braking force on a turning outer radius and hence an improvement in stability on straight running.

Also, during braking by the driver applying pressure on the brake pedal 12, for example if the fact that the left front wheel treads on a road with a low coefficient of friction and exhibits a tendency to lock is detected based on outputs from the wheel speed sensors Sc, . . . , one in-valve 58 of the first brake actuator 51A is closed by excitation and one out-valve 61 is opened by excitation thereby to let brake fluid pressure in the wheel cylinder 16 of the left front wheel escape into the reservoir 62 and reduce the brake fluid pressure to a predetermined pressure, and thereafter, the out-valve 61 is closed by demagnetization thereby to hold the brake fluid pressure in the wheel cylinder 16 of the left front wheel. When the locking tendency of the wheel cylinder 16 of the left front wheel is consequently being eliminated, the in-valve 58 is opened by demagnetization thereby to feed brake fluid pressure from the rear output port 41A of the slave cylinder 23 to the wheel cylinder 16 of the left front wheel and increase the brake fluid pressure to a predetermined pressure, thereby increasing the braking force.

If the left front wheel exhibits the tendency to lock again due to the increase in the pressure, the above-described procedure that involves reducing the pressure, then holding the pressure, and then increasing the pressure can be repeated thereby to perform ABS (antilock braking system) control that minimizes a braking distance, while suppressing the locking of the left front wheel.

Although description has been given above with regard to the ABS control as performed when the wheel cylinder 16 of the left front wheel exhibits the tendency to lock, the ABS control may be performed in the same manner when the wheel cylinder 17 of the right rear wheel, the wheel cylinder 20 of the right front wheel, or the wheel cylinder 21 of the left rear wheel exhibits the tendency to lock.

Figure 4:
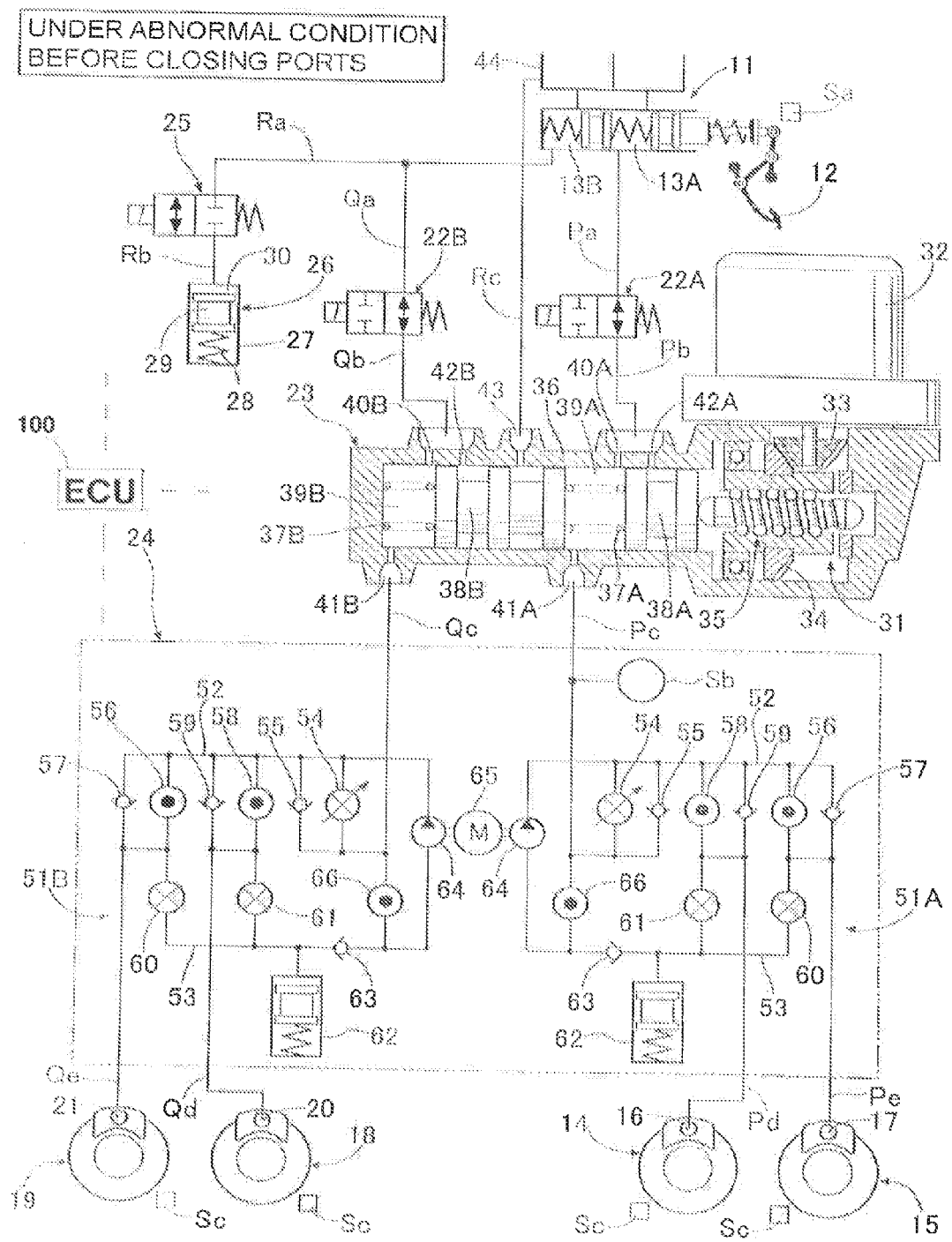
FIG. 4 is a diagram of the fluid pressure circuit under an abnormal condition (before closing ports of a master cylinder). (first embodiment)

Now, under abnormal conditions such as situations where the slave cylinder 23 is incapable of operation due to its failure, as shown in FIG. 4, the shut-off valves 22A and 22B are opened, the reaction force admission valve 25 is closed, the in-valves 56, 56 and 58, 58 are opened, and the out-valves 60, 60 and 61, 61 are closed. Further, as distinct from the normal condition shown in FIG. 1, the regulator valves 54 and 54 are closed by excitation, and the suction valves 66 and 66 are opened by excitation. In this state, when the pumps 64 and 64 are brought into operation at the same time that the driver applies pressure on the brake pedal 12, brake fluid that has been sucked from the slave cylinder 23 side through the suction valves 66 and 66 and pressurized by the pumps 64 and 64 is fed to the regulator valves 54 and 54 and the in-valves 56, 56 and 58, 58. Thus, the regulator valves 54 and 54 are excited to adjust the opening degree and thereby regulate brake fluid pressure in the fluid paths 52 and 52, and also, the brake fluid is fed to the wheel cylinders 16, 17 and 20, 21 through the in-valves 56, 56 and 58, 58 opened by excitation, thereby enabling the prefilling of the brake fluid into the wheel cylinders 16, 17 and 20, 21.

The above-described driving of the pumps 64 and 64 is continued until the instant that the rear and front pistons 71A and 71B of the master cylinder 11 pass the rear and front inlet ports 73A and 73B thereby to generate brake fluid pressure in the rear and front fluid pressure chambers 13A and 13B. Thus, during a duration between the application of pressure on the brake pedal 12 by the driver and the generation of the brake fluid pressure by the master cylinder 11, a predetermined amount of brake fluid can be supplied in advance to the wheel cylinders 16, 17 and 20, 21.

Figure 5:
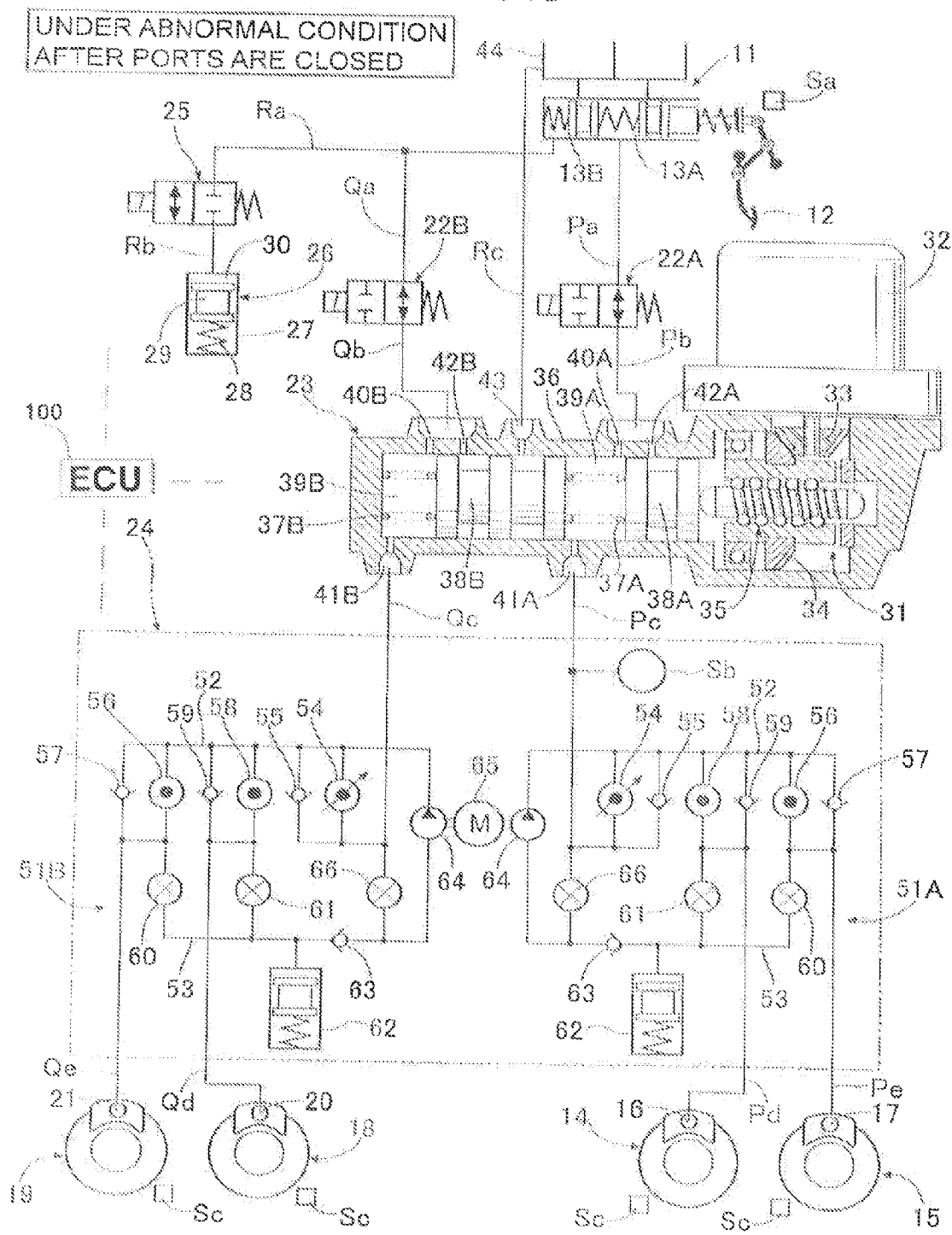
FIG. 5 is a diagram of the fluid pressure circuit under an abnormal condition (after the ports of the master cylinder are closed). (first embodiment)

When the driver further applies pressure on the brake pedal 12 and thereby the rear and front pistons 71A and 71B of the master cylinder 11 pass the rear and front inlet ports 73A and 73B to generate brake fluid pressure in the rear and front fluid pressure chambers 13A and 13B, as shown in FIG. 5, the regulator valves 54 and 54 are opened by demagnetization, and the suction valves 66 and 66 are closed by demagnetization. In this state, the brake fluid pressure generated in the rear and front fluid pressure chambers 13A and 13B of the master cylinder 11 passes the shut-off valves 22A and 22B, the rear and front fluid pressure chambers 39A and 39B of the slave cylinder 23 and the in-valves 56, 56 and 58, 58 without being absorbed by the stroke simulator 26, that is, without increasing the stroke of the brake pedal 12, and effects operation of the wheel cylinders 16, 17 and 20, 21 of the disc brake devices 14, 15 and 18, 19 of the wheels thereby to enable generating braking forces.

FIG. 6 is a graph explaining the above-described operations or effects. While as shown in FIG. 6(A) the stroke of the brake pedal 12 gradually increases and reaches port closing stroke in which the rear and front inlet ports 73A and 73B of the master cylinder 11 are blocked, the regulator valves 54 and 54 are closed by excitation (see FIG. 4) concurrently with operation of the pumps 64 and 64 thereby to prefill the brake fluid into the wheel cylinders 16, 17 and 20, 21, as shown in FIGS. 6(B), (C) and (D). As a result, when the brake fluid pressure is generated by blocking the rear and front inlet ports 73A and 73B of the master cylinder 11 by increasing the stroke of the brake pedal 12, the brake fluid supplied by the master cylinder 11 is added to the prefilled brake fluid to thus increase the brake fluid pressure in the wheel cylinders 16, 17 and 20, 21. (See the solid line of FIG. 6(B).)

Thus, the start of the operation of the brake fluid pressure supplied to the wheel cylinders 16, 17 and 20, 21 can be accelerated to reduce the stroke of the brake pedal 12 for achieving a required brake fluid pressure. The broken line of FIG. 6(B) shows characteristics as observed when the above-described prefilling does not take place, and the start of the operation of the brake fluid pressure supplied to the wheel cylinders 16, 17 and 20, 21 is delayed, thus leading to an increase in the stroke of the brake pedal 12 for achieving the required brake fluid pressure.

According to the embodiment, as described above, the prefilling for the wheel cylinders 16, 17 and 20, 21 enables a reduction in the stroke of the brake pedal 12 for achieving the required brake fluid pressure. Also, even when, in order to improve the pedal feeling, the clearance α (see FIG. 2) is provided between the push rod 75 of the master cylinder 11 and the rear piston 71A thereby to set the ineffective stroke, an increase in the stroke of the brake pedal 12 due to the ineffective stroke can be compensated for and reduced to a normal stroke.

Moreover, the time at which the pumps 64 and 64 are used to prefill the wheel cylinders 16, 17 and 20, 21 is set to the initial period of the application of pressure on the brake pedal 12, and thus, the prefilling takes place under a condition where the brake fluid pressure on the wheel cylinders 16, 17 and 20, 21 is still low, thus enabling savings in drive energy for the pumps 64 and 64, as compared to an instance where the prefilling takes place in the last stage of the application of pressure on the brake pedal 12 in which the brake fluid pressure is high.

An embodiment of the present invention is explained above, but the present invention may be modified in a variety of ways as long as the modifications do not depart from the gist thereof.

For example, in the embodiment the prefilling for the wheel cylinders 16, 17 and 20, 21 is carried out by use of the pump 64 of the VSA device 24, but it is also possible to use the pump of an ABS device instead of the VSA device 24.

The invention claimed is:

1. A braking device including:
a master cylinder that generates brake fluid pressure by operation of a brake pedal by a driver;
a wheel cylinder that performs braking on a wheel;
a slave cylinder disposed between the master cylinder and the wheel cylinder, the slave cylinder generating brake fluid pressure by an electric motor that operates according to the operation of the brake pedal,
a normally open regulator valve provided in a fluid path extending between the slave cylinder and the wheel cylinder,
a pump that feeds brake fluid and is disposed between the slave cylinder and the wheel cylinder, and
a controller which is programmed to control operations of the braking device based on the operation of the brake pedal by the operator,
wherein
under a fault condition of the slave cylinder the controller controls the braking device such that the brake fluid pressure generated by the master cylinder is supplied to the wheel cylinder for operating the wheel cylinder, ineffective stroke is set for the brake pedal before the master cylinder starts operating, and, under the fault condition of the slave cylinder, during an initial period of the operation of the brake pedal, before the brake fluid pressure is generated from the master cylinder, the controller closes the regulator valve and operates the pump to feed the brake fluid to the wheel cylinder to compensate for an increase in operation stroke of the brake pedal by the ineffective stroke,
and when the brake fluid pressure is generated from the master cylinder, the controller stops operation of the pump, and keeps the regulator valve closed for a predetermined period of time after the pump stops operating.

2. The braking device according to claim 1, wherein the brake pedal includes a link mechanism that boosts pedal pressure applied by the driver and transmits the boosted pressure to the master cylinder.

3. The braking device according to claim 2, further including a stroke simulator connected to the master cylinder via a reaction force admission valve, wherein the controller closes the reaction force admission valve before the pump is driven.

4. The braking device according to claim 1, further including a stroke simulator connected to the master cylinder via a reaction force admission valve, wherein the controller closes the reaction force admission valve before the pump is driven.

5. The braking device according to claim 1, wherein even in a condition where the brake fluid pressure in the wheel cylinder does not reach a demanded level, the controller stops operation of the pump, and keeps the regulator valve closed for a predetermined period of time after the pump stops operating and, after said predetermined period of time has lapsed, the controller opens the regulator valve.

6. The braking device according to claim 1, wherein the pump is part of either a vehicle stability assist (VSA) device or an anti-lock braking system (ABS).

7. A method of operating a vehicular braking system comprising a master cylinder that generates brake fluid pressure by operation of a brake pedal by a driver, a wheel cylinder that performs braking on a wheel, a slave cylinder disposed between the master cylinder and the wheel cylinder and which generates brake fluid pressure by an electric motor that operates according to the operation of the brake pedal, a pump disposed between the slave cylinder and the wheel cylinder for feeding brake fluid to the wheel cylinder, and a normally open regulator valve provided in a fluid path extending between the slave cylinder and the wheel cylinder, wherein the wheel cylinder is configured to be operable by the brake fluid pressure generated by the master cylinder under a fault condition of the slave cylinder, said method comprising the steps of:
a) under the fault condition of the slave cylinder, closing the regulator valve and feeding brake fluid to the wheel cylinder using said pump during an initial period of the operation of the brake pedal, before the brake fluid pressure is generated from the master cylinder,
b) stopping operation of the pump when brake fluid pressure begins to be generated from the master cylinder,
c) keeping the regulator valve closed for a predetermined period of time after the pump stops operating, and
d) opening the regulator valve and routing brake fluid pressure from the master cylinder to the wheel cylinder after the predetermined period of time has elapsed.

8. The method according to claim 7, wherein ineffective stroke is set for the brake pedal before the master cylinder starts operating, and, under the fault condition of the slave cylinder, during an initial period of the operation of the brake pedal, before the brake fluid pressure is generated from the master cylinder, the regulator valve is closed and the pump feeds the brake fluid to the wheel cylinder to compensate for an increase in operation stroke of the brake pedal by the ineffective stroke.

9. The method according to claim 7, wherein the pump is part of either a vehicle stability assist (VSA) device or an anti-lock braking system (ABS).

* * * * *